United States Patent
Zhang et al.

(10) Patent No.: US 11,302,104 B2
(45) Date of Patent: Apr. 12, 2022

(54) METHOD, APPARATUS, DEVICE, AND STORAGE MEDIUM FOR PREDICTING THE NUMBER OF PEOPLE OF DENSE CROWD

(71) Applicant: BAIDU ONLINE NETWORK TECHNOLOGY (BEIJING) CO., LTD., Beijing (CN)

(72) Inventors: Chengyue Zhang, Beijing (CN); Zeyu Liu, Beijing (CN); Zhizhen Chi, Beijing (CN); Le Kang, Sunnyvale, CA (US); Mingyu Chen, Beijing (CN); Yingze Bao, Sunnyvale, CA (US); Jian Wang, Beijing (CN); Xubin Li, Beijing (CN); Shilei Wen, Beijing (CN); Errui Ding, Beijing (CN); Xiao Liu, Beijing (CN); Hao Sun, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 383 days.

(21) Appl. No.: 16/458,504

(22) Filed: Jul. 1, 2019

(65) Prior Publication Data
US 2019/0325231 A1 Oct. 24, 2019

(30) Foreign Application Priority Data
Jul. 2, 2018 (CN) .......................... 201810709561.7

(51) Int. Cl.
*G06K 9/00* (2022.01)
*G06K 9/46* (2006.01)
(Continued)

(52) U.S. Cl.
CPC .......... *G06V 20/53* (2022.01); *G06K 9/6257* (2013.01); *G06V 10/56* (2022.01); *G06V 10/754* (2022.01)

(58) Field of Classification Search
CPC ............ G06K 9/00778; G06K 9/4652; G06K 9/6206; G06K 9/6257
See application file for complete search history.

(56) References Cited

U.S. PATENT DOCUMENTS

| 8,295,545 B2 | 10/2012 | Hampapur et al. |
| 2009/0222388 A1 | 9/2009 | Hua et al. |

FOREIGN PATENT DOCUMENTS

| CN | 107624189 A | 1/2018 |
| CN | 107679502 A | 2/2018 |

(Continued)

OTHER PUBLICATIONS

Farhood, Helia, et al. "Counting people based on linear, weighted, and local random forests." 2017 International Conference on Digital Image Computing: Techniques and Applications (DICTA), 7 pages (Year: 2017).*

(Continued)

*Primary Examiner* — David F Dunphy
(74) *Attorney, Agent, or Firm* — Dilworth IP, LLC

(57) ABSTRACT

A method, apparatus, device, and storage medium for predicting the number of people of a dense crowd, including: converting a first image, in which the number of people is to be determined, into a corresponding first thermodynamic chart according to a thermodynamic chart conversion model; and determining the number of people in the first image according to the first thermodynamic chart, wherein the thermodynamic chart conversion model is obtained by training according to a pre-marked second image and a thermodynamic chart corresponding to each second image, thereby achieving prediction of the number of people of a dense crowd, improving the accuracy in predicting the number of people of the dense crowd while improving management efficiency.

10 Claims, 5 Drawing Sheets

(51) Int. Cl.
G06K 9/62    (2022.01)
G06V 20/52   (2022.01)
G06V 10/56   (2022.01)
G06V 10/75   (2022.01)

(56) References Cited

FOREIGN PATENT DOCUMENTS

| | | | |
|---|---|---|---|
| JP | 2009222388 | A | 10/2009 |
| WO | 2016183766 | A1 | 11/2016 |

OTHER PUBLICATIONS

European Search Report; Application No. EP 19183843.2; dated Nov. 20, 2019, 4 pages.
Zhang, Y et al., Single-Image Crowd Counting via Multi-Column Convolutional Neural Network, IEEE Computer Society, 2016, pp. 589-597.
First Office Action issued in JP Patent Application No. 2019-122860 dated Sep. 8, 2020.
First Office Action in CN Patent Application No. 201810709561.7 dated Nov. 25, 2021.

* cited by examiner

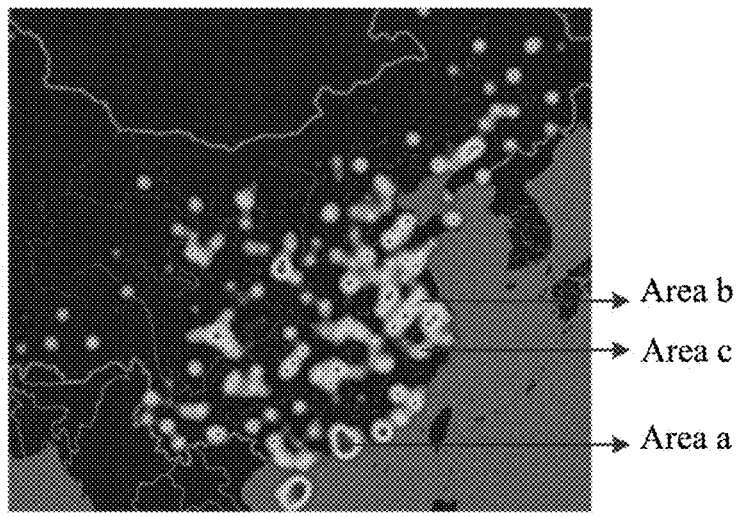

FIG. 2

```
┌─────────────────────────────────────────────────┐
│ Obtaining the thermodynamic chart conversion model │ ─── S201
│ by training according to a pre-marked second image │
│ and a thermodynamic chart corresponding to each    │
│                 second image                       │
└─────────────────────────────────────────────────┘
                        │
                        ▼
┌─────────────────────────────────────────────────┐
│ Converting a first image, in which the number of people │ ─── S202
│ is to be determined, into a corresponding first        │
│ thermodynamic chart according to the thermodynamic     │
│              chart conversion model                    │
└─────────────────────────────────────────────────┘
                        │
                        ▼
┌─────────────────────────────────────────────────┐
│ Determining the number of people in the first   │ ─── S203
│ image according to the first thermodynamic chart │
└─────────────────────────────────────────────────┘
```

FIG. 3

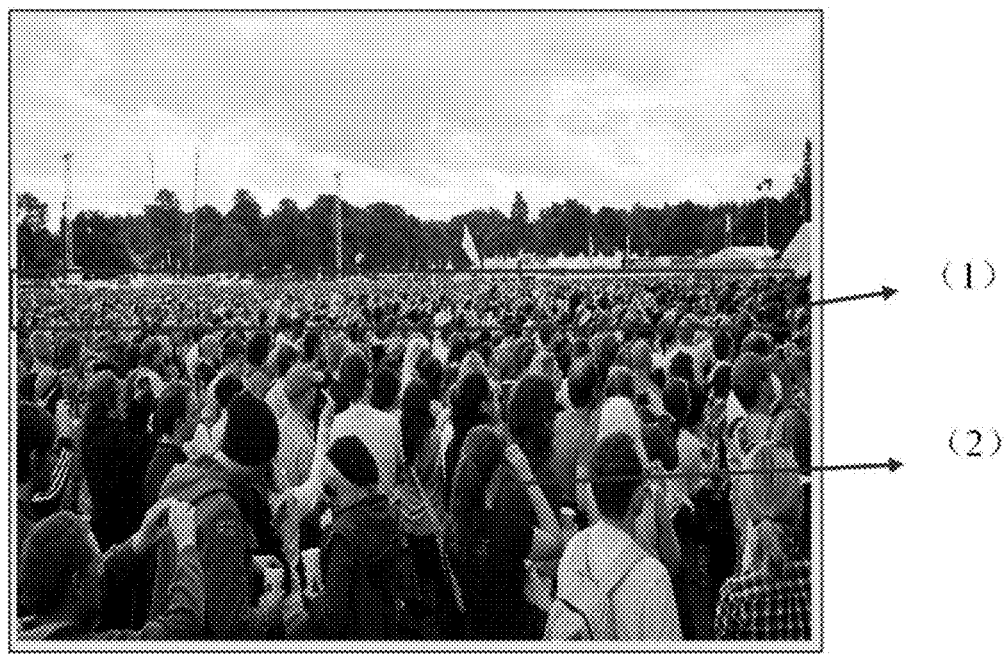
FIG. 4-A
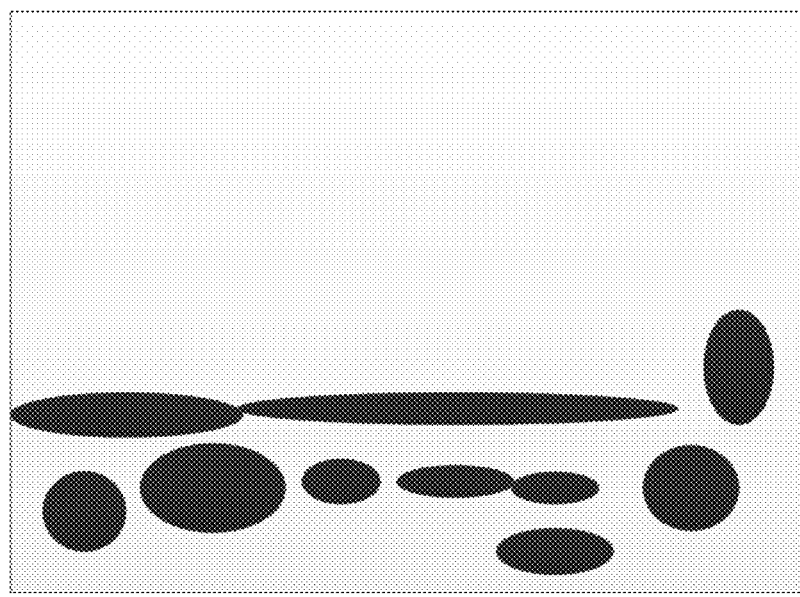
FIG. 4-B

METHOD, APPARATUS, DEVICE, AND STORAGE MEDIUM FOR PREDICTING THE NUMBER OF PEOPLE OF DENSE CROWD

CROSS-REFERENCE TO RELATED APPLICATION

The present application claims priority to Chinese application number 201810709561.7, filed on Jul. 2, 2018, which is incorporated by reference in its entirety.

FIELD

Embodiments of the present disclosure relate to the field of artificial intelligence technologies and, in particular, to a method, an apparatus, a device, and a storage medium for predicting the number of people of a dense crowd.

BACKGROUND

With the rapid development of the economy and the growth of the population, the flow of people in public areas such as offline retail, airports, and subways is increasing. In order to analyze and predict the sales volume of products, the applicable crowd, and making an early warning of security situations such as congestion in an area, the prediction of the flow of people has become one of the basic means necessary for each area manager.

Currently, two methods for predicting the number of people are provided. One method is based on a detection method, which mainly detects the head and shoulders of a human body, and specifically, obtains the number of people according to the number of detection boxes. The other is direct regression prediction of the number of people, specifically, directly getting the number of people or density level, based on a whole picture or partial picture, through a convolutional neural network (CNN).

However, for a dense crowd, there are large errors in the prediction of the number of people using the existing solutions, which leads to the management department unable to take effective measures in time to solve the problems caused by the dense crowd, resulting in a decline in management efficiency.

SUMMARY

Embodiments of the present disclosure provide a method, an apparatus, a device, and a storage medium for predicting the number of population of a dense crowd, in order to solve the problem that the number of people is inaccurately predicted for the dense crowd in the above solutions.

A first aspect of the present disclosure provides a method for predicting the number of people of a dense crowd, including:
  converting a first image, in which the number of people is to be determined, into a corresponding first thermodynamic chart according to a thermodynamic chart conversion model; and
  determining the number of people in the first image according to the first thermodynamic chart,
  where the thermodynamic chart conversion model is obtained by training according to a pre-marked second image and a thermodynamic chart corresponding to each second image.

Optionally, before the converting a first image, in which the number of people is to be determined, into a corresponding first thermodynamic chart according to a thermodynamic chart conversion model, the method also includes:
  obtaining the thermodynamic chart conversion model by training according to the pre-marked second image and the thermodynamic chart corresponding to each second image,
  where each second image includes a first area that is marked ignored, and the thermodynamic chart corresponding to the second image does not include a portion of the thermodynamic chart corresponding to the first area.

Optionally, the obtaining the thermodynamic chart conversion model by training according to the pre-marked second image and the thermodynamic chart corresponding to each second image includes:
  obtaining a thermodynamic chart conversion model according to the pre-marked second image and the thermodynamic chart corresponding to each second image; deforming the second image, and then training the thermodynamic chart conversion model to obtain a final thermodynamic chart conversion model.

Optionally, the deforming the second image includes at least one of the followings:
  scaling each second image by a preset ratio;
  enlarging each second image according to a preset ratio;
  translating each second image according to a preset distance;
  rotating each second image by a preset angle.

A second aspect of an embodiment of the present disclosure provides an apparatus for predicting the number of people of a dense crowd, including:
  a converting module, configured to convert a first image, in which the number of people is to be determined, into a corresponding first thermodynamic chart according to a thermodynamic chart conversion model;
  an obtaining module, configured to determine the number of people in the first image according to the first thermodynamic chart;
  where the thermodynamic chart conversion model is obtained by training according to a pre-marked second image and a thermodynamic chart corresponding to each second image.

Optionally, the apparatus also includes:
  a training module, configured to obtain the thermodynamic chart conversion model by training according to the pre-marked second image and the thermodynamic chart corresponding to each second image;
  where each second image includes a first area that is marked as ignored, and the thermodynamic chart corresponding to the second image does not include a portion of the thermodynamic chart corresponding to the first area.

Optionally, the training module is specifically configured to:
  obtain a thermodynamic chart conversion model according to the pre-marked second image and the thermodynamic chart corresponding to each second image; deform the second image, and then train the thermodynamic chart conversion model to obtain a final thermodynamic chart conversion model.

Optionally, the training module is further configured to:
  scale each second image by a preset ratio;
  enlarge each second image according to a preset ratio;
  translate each second image according to a preset distance;
  rotate each second image by a preset angle.

A third aspect of the present disclosure further provides an electronic device, including: a transmitter, a receiver, a processor, a memory, and a computer program, the computer program being stored in the memory, where the processor executes the computer program to implement the method for predicting the number of people of a dense crowd as provided by any one of the foregoing implementations of the first aspect.

A fourth aspect of the present disclosure further provides a computer readable storage medium, storing a computer program therein, the computer program being configured to implement the method for predicting the number of people of a dense crowd as provided by any one of the foregoing implementations of the first aspect.

According to the method, apparatus, device and storage medium for predicting the number of people of a dense crowd provided by the embodiments of the present disclosure, a first image, in which the number of people is to be determined, is converted into a corresponding first thermodynamic chart according to a thermodynamic chart conversion model; the number of people in the first image is determined according to the first thermodynamic chart, where the thermodynamic chart conversion model is obtained by training according to a pre-marked second image and a thermodynamic chart corresponding to each second image, thereby realizing the prediction of the number of people of the dense crowd, improving the accuracy in predicting the number of people of the dense crowd while improving management efficiency.

BRIEF DESCRIPTION OF THE DRAWINGS

In order to more clearly illustrate embodiments of the present disclosure or the technical solutions in the prior art, a brief description of the drawings that need to be used in the description of the embodiments or the prior art will be briefly described below. Obviously, the drawings in the following description are only some embodiments of the present disclosure. For those skilled in the art, other drawings can be derived according to these drawings without paying creative labor.

FIG. 2 is a schematic diagram of a thermodynamic chart provided by an embodiment of the present disclosure;

FIG. 3 is a flowchart of Embodiment 2 of a method for predicting the number of people of a dense crowd according to an embodiment of the present disclosure;

FIG. 4-A is a schematic diagram of a second image and according to an embodiment of the present disclosure;

FIG. 4-B is a thermodynamic chart corresponding to FIG. 4-A;

DETAILED DESCRIPTION OF THE EMBODIMENTS

In order to make the objectives, technical solutions and advantages of embodiments of the present disclosure clearer, the technical solutions in the embodiments of the present disclosure are clearly and completely described in the following with reference to the accompanying drawings in the embodiments of the present disclosure. It is apparent that the described embodiments are part of the embodiments of the present disclosure, rather than all of them. Based on the embodiments in the present disclosure, all other embodiments obtained by those of ordinary skill in the art without creative effort are within the scope of the present disclosure.

In the currently available methods for predicting the number of people of a dense crowd, one method is based on a detection method, specifically detecting the head and shoulders of a human body, and obtains the number of people according to the number of detection boxes. The other is direct regression prediction of the number of people, and specifically, directly getting the number of people or density level based on a whole picture or partial picture, through a convolutional neural network (CNN).

Although the first method provides good prediction effect for a close-range scene, a problem arises that, when the people become smaller, especially when concealment is severe and density is high, the performance is significantly reduced. The problem of the second method is a large error in the prediction result. Moreover, the model is difficult to learn because of the lack of effective supervision information. Therefore, the existing methods for predicting the number of people have large errors in the prediction results, failing to accurately predict the number of people, resulting in a reduced management efficiency.

In view of the above problems, the present disclosure proposes a method for predicting the number of people of a dense crowd, where a trained thermodynamic chart conversion model is used to obtain a thermodynamic chart, the number of people is determined according to the thermodynamic chart, thereby improving the accuracy in predicting the number of people of the dense crowd while improving management efficiency. Now, the solution will be is described in detail below through several specific embodiments.

Figure 1:
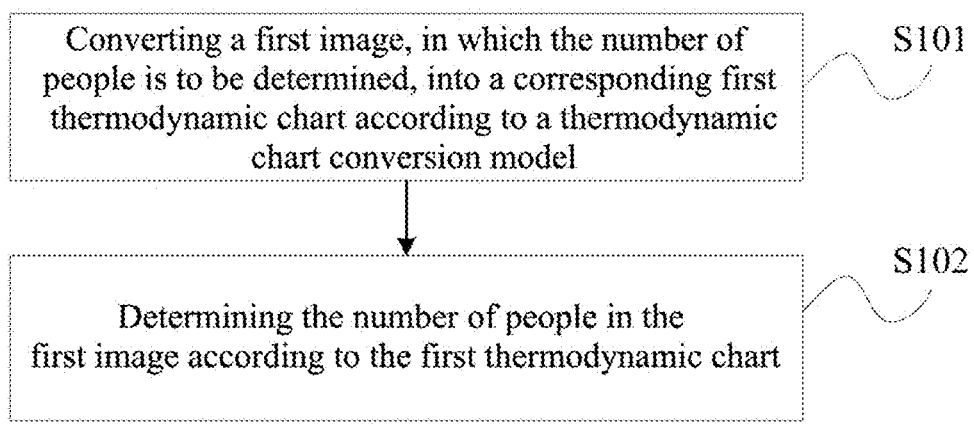
FIG. 1 is a flowchart of Embodiment 1 of a method for predicting the number of people of a dense crowd provided by an embodiment of the present disclosure.

FIG. 1 is a flowchart of Embodiment 1 of a method for predicting the number of people of a dense crowd according to an embodiment of the present disclosure. As shown in FIG. 1, the executive body of the solution is an electronic device, such as a computer and/or a tablet. The method for predicting the number of people of a dense crowd specifically includes the following steps:

S101, converting a first image, in which the number of people is to be determined, into a corresponding first thermodynamic chart according to a thermodynamic chart conversion model.

It should be understood that a thermodynamic chart is a graphical representation describing the crowd distribution in real time using blocks of different colors. FIG. 2 is a schematic diagram of a thermodynamic chart provided by an embodiment of the present disclosure. Referring to FIG. 2, the thermodynamic chart can indicate the crowd density in this area. In the figure, the Area a may indicate that the crowd is congested, the Area b may indicate that the crowd is sparse, and the Area c may indicate that the crowd density is moderate.

The thermodynamic chart conversion model may a model obtained by training according to a pre-marked second image and a thermodynamic chart corresponding to each second image. Specifically, the second image may be any image including a crowd, and the pre-marked second image may be an image after marking the second image. For example, according to a subjective judgment about the density level, a crowded area may be marked as a first area, and a sparse area may be marked as an effective area. It should be noted that the number of people in the effective area is known.

In a specific implementation of the solution, a corresponding thermodynamic chart is generated for each pre-marked second image. It should be understood that the corresponding thermodynamic chart generated from the pre-marked second image may not include the first area, and training each pre-marked second image and the thermodynamic chart corresponding to each second image are trained, so that the number of people in the thermodynamic chart infinitely approaches the number of people in the effective area of the second image, thereby obtaining the thermodynamic chart conversion model.

In this step, a first image, in which the number of people is to be determined, is converted into a corresponding first thermodynamic chart according to the thermodynamic chart conversion model, where the first image may be any image including a crowd, of which the number of people is to be determined. Optionally, the first image may be the second image.

S102, determining the number of people in the first image according to the first thermodynamic chart.

In this step, the first image is converted into the corresponding first thermodynamic chart according to the thermodynamic chart conversion model, and then the number of people in the first image is determined according to the first thermodynamic chart.

According to the method for predicting the number of people of a dense crowd provided by this embodiment, a first image, in which the number of people is to be determined, is converted into a corresponding first thermodynamic chart according to the thermodynamic chart conversion model; the number of people in the first image is determined according to the first thermodynamic chart, where the thermodynamic chart conversion model is a model obtained by training according to a pre-marked second image and a thermodynamic chart corresponding to each second image, thereby realizing the prediction of the number of people of the dense crowd, improving the accuracy in predicting the number of people of the dense crowd while improving management efficiency.

FIG. 3 is a flowchart of Embodiment 2 of predicting the number of people of a dense crowd according to an embodiment of the present disclosure. As shown in FIG. 3, on the basis of the Embodiment 1, in another implementation of the method for predicting the number of people of the dense crowd, the following steps are specifically included.

S201, obtaining the thermodynamic chart conversion model by training according to a pre-marked second image and a thermodynamic chart corresponding to each second image.

In this step, the second image may be any image including a crowd. Optionally, the second image is marked as two areas. In an implementation, a density threshold may be preset, where an area exceeding the preset density threshold may be marked as a first area, whose the number of people may not be known due to its excessive crowd density. An area that does not exceed the preset density threshold may be marked as an effective area, whose the number of people is known. From the second image, a corresponding thermodynamic chart, that does not include a portion of the thermodynamic chart corresponding to the first area, is generated. That is, the portion of the thermodynamic chart corresponding to the first area is ignored.

The second image and its corresponding thermodynamic chart will be specifically described below. Refer to FIG. 4, which is a schematic diagram of a second image and a corresponding thermodynamic chart provided by an embodiment of the present disclosure:

Assuming that FIG. 4-A is the second image, in FIG. 4A, the area (1) is marked as a first area, and the area (2) is marked as an effective area. FIG. 4-B is a thermodynamic chart corresponding to the second image, and the thermodynamic chart corresponding to the second image may be a graphical representation describing the crowd distribution in real time using blocks of different colors. It should be noted that the thermodynamic chart corresponding to the second image herein may not include the portion of the thermodynamic chart corresponding to the first area in each second image, that is, the thermodynamic chart of FIG. 4-B is a thermodynamic chart corresponding to the area (2) in FIG. 4-A.

In a specific implementation of this solution, the thermodynamic chart conversion model is obtained by training according to a pre-marked second image and a thermodynamic chart corresponding to each second image. Optionally, the thermodynamic chart conversion model is obtained by training according to the effective area of each second image and the thermodynamic chart corresponding to the effective area. Specifically, since the number of people in the effective area of each second image is known, each second image can generate a corresponding thermodynamic chart. By training, the number of people based on statistics of the thermodynamic chart corresponding to each image may infinitely approach the number of people in the effective area of the corresponding second image, thereby obtaining the thermodynamic chart conversion model.

It should be noted that the second image may be any image that includes a crowd and covers various sizes, locations in any scene, where the scene may be subway, airport, shopping mall, classroom, etc.

S202, converting a first image, in which the number of people is to be determined, into a corresponding first thermodynamic chart according to the thermodynamic chart conversion model.

In this step, the first image may be any crowd image in which the number of people is to be determined. The first image may be used as an input to the thermodynamic chart conversion model to obtain the first thermodynamic chart corresponding to the first image.

S203, determining the number of people in the first image according to the first thermodynamic chart.

The foregoing steps S202 and S203 are similar to the specific implementations of the steps S101 and S102 in the Embodiment 1. Thus, reference may be made to the solution in the Embodiment 1, the details of which will not be repeated herein.

According to the method for predicting the number of people of the dense crowd provided by this embodiment, the thermodynamic chart conversion model is obtained by training according to the pre-marked second image and the thermodynamic chart corresponding to each second image, and then the first image, in which the number of people is to be determined, is converted into a corresponding first thermodynamic chart according to the thermodynamic chart conversion model, so that the number of people in the first image may be determined according to the first thermodynamic chart, where each second image includes a first area that is marked as ignored, and the thermodynamic chart corresponding to the second image does not include the portion of the thermodynamic chart corresponding to the first area, thereby achieving a prediction of the number of people of the dense crowd, improving the accuracy in predicting the number of people of the dense crowd while improving management efficiency.

Figure 5:
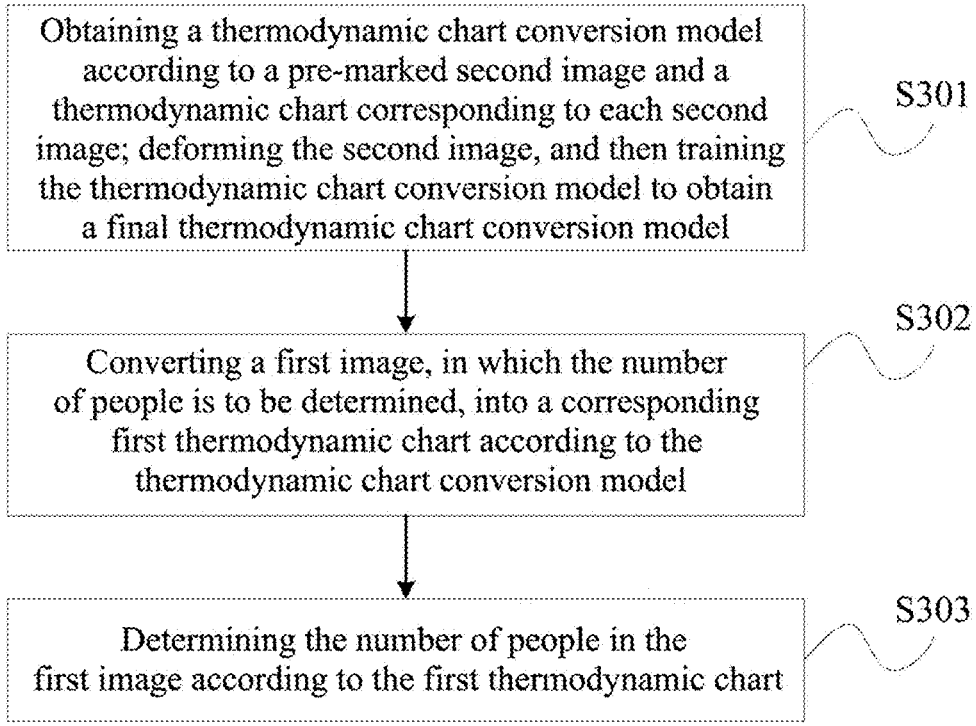
FIG. 5 is a flowchart of Embodiment 3 of a method for predicting the number of people of a dense crowd according to an embodiment of the present disclosure.

FIG. 5 is a flowchart of Embodiment 3 of a method for predicting the number of people of a dense crowd according to an embodiment of the present disclosure. As shown in FIG. 5, on the basis of the foregoing Embodiment 1 and Embodiment 2, in yet another implementation of the method for predicting the number of people of the dense crowd, the following steps are specifically included:

S301, obtaining a thermodynamic chart conversion model according to a pre-marked second image and a thermodynamic chart corresponding to each second image; deforming the second image, and then training the thermodynamic chart conversion model to obtain a final thermodynamic chart conversion model.

In this step, the first thermodynamic chart conversion model may be obtained according to the pre-marked second image and the thermodynamic chart corresponding to each second image. Then, the second image may be deformed to obtain a third image. Each third image is used as an input into the first thermodynamic chart conversion model to obtain a thermodynamic chart corresponding to the third image. By training, the number of people based on statistics of the thermodynamic chart corresponding to each third image infinitely approaches the number of people in the effective area of each second image, thereby obtaining the final thermodynamic chart conversion model.

It should be understood that the number of people based on statistics of the thermodynamic chart corresponding to each third image and the number of people based on statistics of the thermodynamic chart corresponding to the corresponding second image may be the same, and the third image may also include the first area, while the thermodynamic chart corresponding to the third image does not include the portion of the thermodynamic chart corresponding to the first area.

Optionally, the deforming the second image may include:
scaling each second image by a preset ratio; and/or enlarging each second image according to a preset ratio; and/or translating each second image according to a preset distance; and/or rotating each second image by a preset angle.

S302, converting a first image, in which the number of people is to be determined, into a corresponding first thermodynamic chart according to the thermodynamic chart conversion model.

S303, determining the number of people in the first image according to the first thermodynamic chart.

The foregoing steps S302 and S303 are similar to the specific implementations of the steps S101 and S102 in the Embodiment 1 and the steps S202 and S203 in the Embodiment 2, and reference can be made to the solutions of the foregoing Embodiment 1 and Embodiment 2, which will not be repeated herein.

According to the method for predicting the number of people of a dense crowd provided by this embodiment, a thermodynamic chart conversion model is obtained according to a pre-marked second image and a thermodynamic chart corresponding to each second image; the second image is deformed, and then the thermodynamic chart conversion model is trained to obtain a final thermodynamic chart conversion model. In addition, a first image, in which the number of people is to be determined, is converted into a corresponding first thermodynamic chart according to the thermodynamic chart conversion model, and the number of people in the first image is determined according to the first thermodynamic chart, where each second image includes a first area that is marked as ignored, and the thermodynamic chart corresponding to the second image does not include the portion of the thermodynamic chart corresponding to the first area. Thus, the prediction of the number of people of the dense crowd is achieved, and the accuracy in predicting the number of people of the dense crowd is improved.

Figure 6:
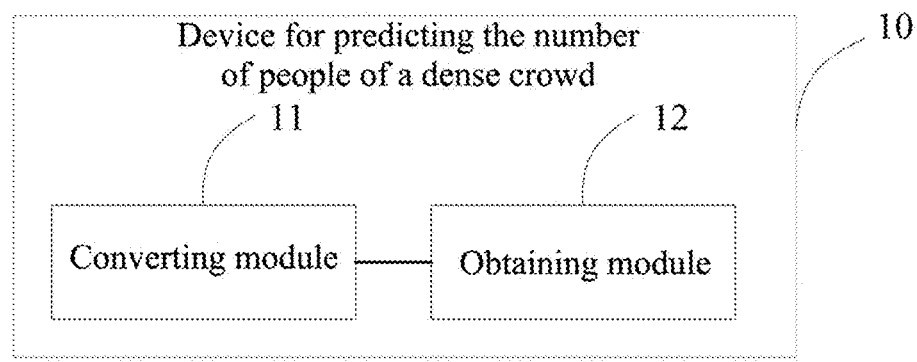
FIG. 6 is a schematic structural diagram of Embodiment 1 of an apparatus for predicting the number of people of a dense crowd according to an embodiment of the present disclosure.

FIG. 6 is a schematic structural diagram of Embodiment 1 of an apparatus for predicting the number of people of a dense crowd according to an embodiment of the present disclosure. As shown in FIG. 6, the apparatus 10 for predicting the number of people of a dense crowd provided in this embodiment includes:

a converting module 11, configured to convert a first image, in which the number of people is to be determined, into a corresponding first thermodynamic chart according to a thermodynamic chart conversion model; and an obtaining module 12, configured to determine the number of people in the first image according to the first thermodynamic chart;

wherein the thermodynamic chart conversion model is obtained by training according to a pre-marked second image and a thermodynamic chart corresponding to each second image.

The apparatus for predicting the number of people of a dense crowd provided by the embodiment is configured to implement the technical solution of the method for predicting the number of people of a dense crowd provided by any one of the foregoing method embodiments. The implementation principle and technical effects thereof are similar, which will not be repeated herein.

Figure 7:
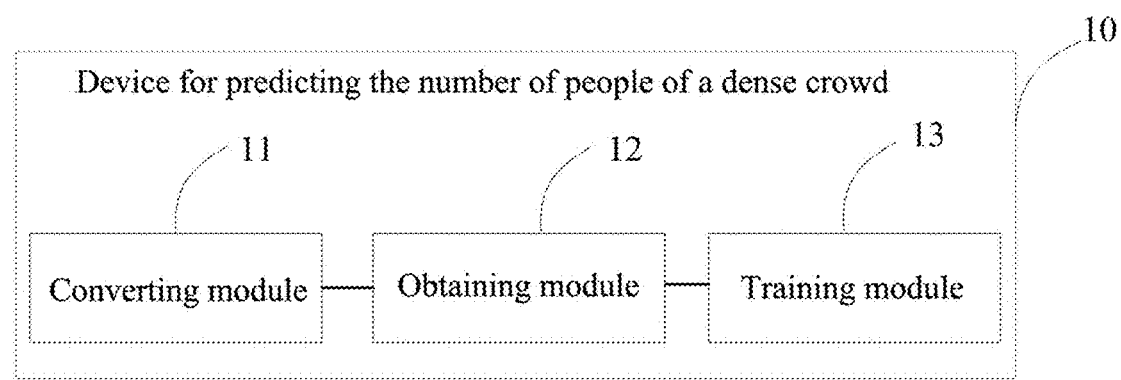
FIG. 7 is a schematic structural diagram of Embodiment 2 of an apparatus for predicting the number of people of a dense crowd according to an embodiment of the present disclosure.

FIG. 7 is a schematic structural diagram of Embodiment 2 of an apparatus for predicting the number of people of a dense crowd according to an embodiment of the present disclosure. As shown in FIG. 7, based on the above module Embodiment 1, optionally, the apparatus 10 for predicting the number of people of a dense crowd may further include:

a training module 13, configured to obtain the thermodynamic chart conversion model by training according to a pre-marked second image and a thermodynamic chart corresponding to each second image, wherein each second image includes a first area that is marked as ignored, and the thermodynamic chart corresponding to the second image does not include a portion of the thermodynamic chart corresponding to the first area.

Optionally, the training module 13 is specifically configured to:

obtain a thermodynamic chart conversion model according to the pre-marked second image and the thermodynamic chart corresponding to each second image; deform the second image, and then train the thermodynamic chart conversion model to obtain a final thermodynamic chart conversion model.

Optionally, the training module 13 is further configured to:

scale each second image by a preset ratio;
enlarge each second image according to a preset ratio;
translate each second image according to a preset distance;
rotate each second image by a preset angle.

The apparatus for predicting the number of people of a dense crowd as provided by the embodiment is configured to implement the technical solution of the method for predicting the number of people of a dense crowd as provided by any one of the foregoing method embodiments. The implementation principle and technical effects thereof are similar, which will not be repeated herein.

The present disclosure also provides an electronic device, including a transmitter, a receiver, a processor, a memory, and a computer program, the computer program is stored in the memory, wherein the processor executes the computer program to implement the method for predicting the number of people of a dense crowd provided by any one of the foregoing embodiments.

The present disclosure further provides a storage medium, including: a readable storage medium and computer instructions that are stored in the readable storage medium, the computer instructions being configured to implement the method for predicting the number of people of a dense crowd provided by any one of the foregoing examples.

In the specific implementation of the foregoing control device, it should be understood that the processor may be a central processing unit (CPU), or some other general-purpose processor, digital signal processor (DSP), application specific integrated circuit (ASIC) etc. The general purpose processor may be a microprocessor, or the processor may be any conventional processor or the like. The steps of the method disclosed in connection with the embodiments of the present disclosure may be directly implemented as steps to be accomplished by a hardware processor or by a combination of hardware and software modules in the processor.

A person of ordinary skill in the art may understand that all or some of the steps of implementing the foregoing method embodiments may be accomplished by hardware related to program instructions. The foregoing program may be stored in a computer readable storage medium. When executed, the program executes the steps included in the above method embodiments. The foregoing storage medium may include: a read-only memory (ROM), a RAM, a flash memory, a hard disk, a solid state hard disk, a magnetic tape, a floppy disk, an optical disc and/or any combination thereof.

Finally, it should be noted that the above embodiments are only used to illustrate the technical solutions of the present disclosure, rather than to limit them. Although the present disclosure has been described in detail with reference to the foregoing embodiments, those skilled in the art should understand that the technical solutions described in the foregoing embodiments may be modified, or some or all of the technical features may be replaced by their equivalents. However, such modifications or replacements do not cause the essence of the technical solution to deviate from the scope of the technical solutions of the embodiments of the present disclosure.

What is claimed is:

1. A method for predicting the number of people of a dense crowd, comprising:
   converting a first image, in which the number of people is to be determined, into a corresponding first thermodynamic chart according to a thermodynamic chart conversion model; and
   determining the number of people in the first image according to the first thermodynamic chart,
   wherein the thermodynamic chart conversion model is obtained by training according to a pre-marked second image and a thermodynamic chart corresponding to each second image, and the thermodynamic chart is a graphical representation describing a crowd distribution in real time using blocks of different colors and indicates crowd density; and
   wherein each second image comprises a first area that is marked as ignored, and the thermodynamic chart corresponding to the second image does not comprise a portion of the thermodynamic chart corresponding to the first area.

2. The method according to claim 1, wherein before the converting of the first image in which the number of people is to be determined into a corresponding first thermodynamic chart according to a thermodynamic chart conversion model, the method further comprises:
   obtaining the thermodynamic chart conversion model by training according to the pre-marked second image and the thermodynamic chart corresponding to each second image.

3. The method according to claim 2, wherein the obtaining the thermodynamic chart conversion model by training according to the pre-marked second image and the thermodynamic chart corresponding to each second image comprises:
   obtaining a thermodynamic chart conversion model according to the pre-marked second image and the thermodynamic chart corresponding to each second image;
   deforming the second image, and then training the thermodynamic chart conversion model to obtain a final thermodynamic chart conversion model.

4. The method according to claim 3, wherein the deforming the second image comprises at least one of:
   scaling each second image by a preset ratio;
   enlarging each second image according to a preset ratio;
   translating each second image according to a preset distance; and
   rotating each second image by a preset angle.

5. An apparatus for predicting the number of people of a dense crowd, comprising: a processor, and a computer readable medium for storing program codes, which, when executed by the processor, cause the processor to:
   convert a first image, in which the number of people is to be determined, into a corresponding first thermodynamic chart according to a thermodynamic chart conversion model; and
   determine the number of people in the first image according to the first thermodynamic chart;
   wherein the thermodynamic chart conversion model is obtained by training according to a pre-marked second image and a thermodynamic chart corresponding to each second image, and the thermodynamic chart is a graphical representation describing a crowd distribution in real time using blocks of different colors and indicates crowd density; and
   wherein each second image comprises a first area that is marked as ignored, and the thermodynamic chart corresponding to the second image does not comprise a portion of the thermodynamic chart corresponding to the first area.

6. The apparatus according to claim 5, wherein the program codes further cause the processor to:
   obtain the thermodynamic chart conversion model by training according to the pre-marked second image and the thermodynamic chart corresponding to each second image.

7. The apparatus according to claim 6, wherein when the program codes cause the processor to obtain the thermodynamic chart conversion model by training according to the pre-marked second image and the thermodynamic chart corresponding to each second image, the program codes cause the processor to:
   obtain a thermodynamic chart conversion model according to the pre-marked second image and the thermodynamic chart corresponding to each second image; deform the second image, and then train the thermodynamic chart conversion model to obtain a final thermodynamic chart conversion model.

8. The apparatus according to claim 7, wherein when the program codes cause the processor to obtain the thermodynamic chart conversion model by training according to the pre-marked second image and the thermodynamic chart corresponding to each second image, the program codes further cause the processor to:

scale each second image by a preset ratio;

enlarge each second image according to a preset ratio;

translate each second image according to a preset distance; or rotate each second image by a preset angle.

9. An electronic device, comprising: a transmitter, a receiver, a processor, a memory, and a computer program, the computer program being stored in the memory, wherein the processor executes the computer program to implement the method for predicting the number of people of a dense crowd according to claim 1.

10. The method according to claim 1, wherein the prediction is made using a computer readable storage medium, storing a computer program therein.

\* \* \* \* \*